United States Patent [19]

Lell et al.

[11] Patent Number: 5,262,135

[45] Date of Patent: Nov. 16, 1993

[54] PROCESS FOR PRODUCING ELEMENTAL SULFUR FROM AN $H_2S$-CONTAINING GAS

[75] Inventors: Rainer Lell, Nidderau; Klaus Stetzer, Dreieich, both of Fed. Rep. of Germany

[73] Assignee: Metallgesellschaft Aktiengesellschaft, Frankfurt am Main, Fed. Rep. of Germany

[21] Appl. No.: 858,195

[22] Filed: Mar. 26, 1992

[30] Foreign Application Priority Data

Mar. 26, 1991 [DE] Fed. Rep. of Germany ....... 4109891

[51] Int. Cl.$^5$ .............................................. C01B 17/16
[52] U.S. Cl. ................... 423/220; 423/222; 423/230; 423/242.1; 423/244.09; 423/244.1; 423/576; 423/574.1
[58] Field of Search ................ 423/222, 230, 242.1, 423/244.09, 244.1, 574 R, 576

[56] References Cited

U.S. PATENT DOCUMENTS

| | | | |
|---|---|---|---|
| 4,097,585 | 6/1978 | Fischer | 423/574 R |
| 4,544,534 | 10/1985 | Dupin et al. | 423/230 |
| 4,623,533 | 11/1986 | Broecker et al. | 423/573 G |
| 4,857,297 | 8/1989 | Kettner et al. | 423/576.8 |
| 4,933,163 | 6/1990 | Fischer et al. | 423/574 R |

FOREIGN PATENT DOCUMENTS

| | | |
|---|---|---|
| 0078690 | 5/1983 | European Pat. Off. . |
| 0054772 | 6/1984 | European Pat. Off. . |
| 0159730 | 10/1985 | European Pat. Off. ........ 423/574 R |
| 0215317 | 3/1987 | European Pat. Off. . |
| 0218302 | 4/1987 | European Pat. Off. . |
| 0346218 | 12/1989 | European Pat. Off. . |
| 3529665 | 2/1987 | Fed. Rep. of Germany ...... 423/222 |
| 3735002 | 4/1989 | Fed. Rep. of Germany . |
| 3925574 | 2/1991 | Fed. Rep. of Germany ...... 423/230 |
| WO87/02653 | 5/1987 | World Int. Prop. O. . |

OTHER PUBLICATIONS

Ullmanns Encykolpadie der Technischen Chemie, 4th Edition, (1982), Jul., vol. 21, pp. 8–26.

Primary Examiner—Gary P. Straub
Assistant Examiner—Timothy C. Vanoy
Attorney, Agent, or Firm—Herbert Dubno; Jonathan Myers

[57] ABSTRACT

The gas to be treated contains $H_2S$ and carbon compounds first enters the combustion chamber of a Claus process plant and a gas mixture which contains 1 to 3 moles $H_2S$ per mole of $SO_2$ is withdrawn from that combustion chamber. The gas mixture is reacted in part to form elemental sulfur in at least one catalytic Claus process stage at temperatures above the dew-point temperature of the sulfur. The elemental sulfur is condensed in and removed from a sulfur cooler. An exhaust gas which contains 0.5 to 5% by volume $H_2S$ and also contains COS, $CS_2$ and $H_2O$ is withdrawn from the last sulfur cooler of the Claus process plant. Oxygen is admixed with that exhaust gas, which is heated to a temperature of at least 200° C. and is contacted with a catalyst, which comprises at least 80% by weight $TiO_2$. The resulting elemental sulfur is condensed and withdrawn. The gas is subsequently contacted at temperatures of 120° to 160° C. with a catalyst which comprises at least 80% by weight $Al_2O_3$.

2 Claims, 1 Drawing Sheet

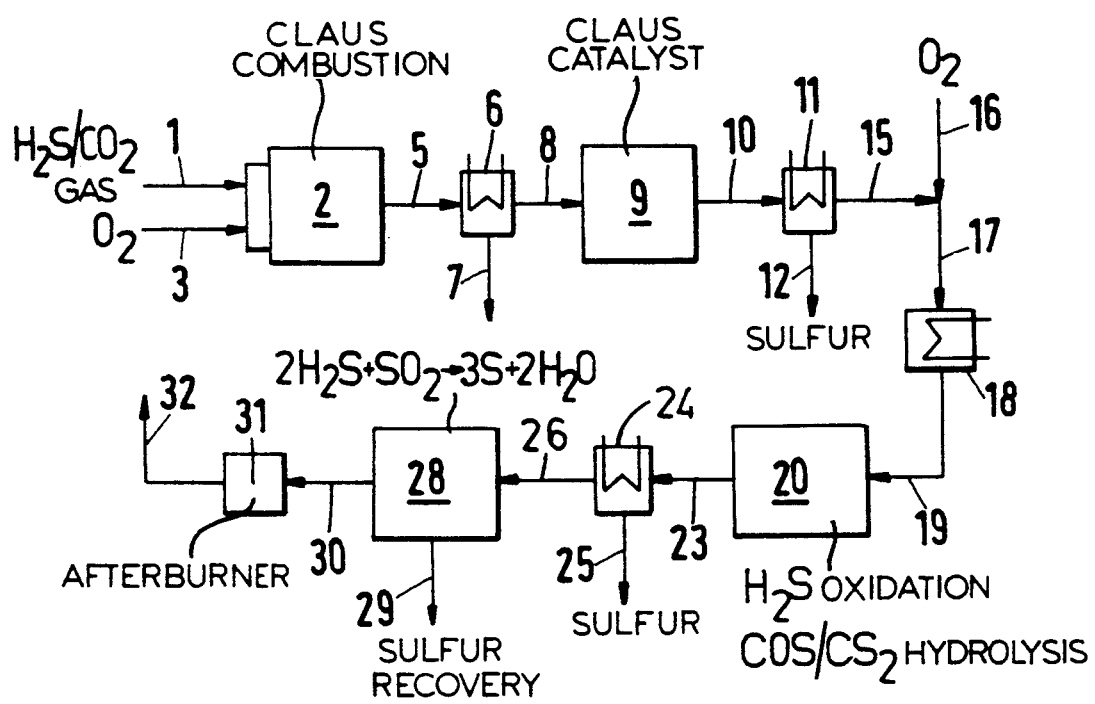

5,262,135

PROCESS FOR PRODUCING ELEMENTAL SULFUR FROM AN H2S-CONTAINING GAS

FIELD OF THE INVENTION

Our present invention relates to a process for producing elemental sulfur from a gas which contains $H_2S$ and carbon compounds in a Claus process plant, in which process the exhaust gas from the Claus process plant is aftertreated, a gas mixture containing 1 to 3 moles $H_2S$ per mole of $SO_2$ is produced in a combustion chamber of the Claus process plant, the gas mixture is reacted in part to form elemental sulfur in at least one catalytic Claus process stage at a temperature above the dew-point temperature of the sulfur, and the elemental sulfur is condensed in a sulfur cooler and separated from the gas.

BACKGROUND OF THE INVENTION

In the known Claus process, gases which contain $H_2S$ are desulfurized and elemental sulfur is produced. Details have been described, e.g., in Ullmanns Encyclopedia of Technical Chemistry, 4th Edition (1982), volume 21, on pages 8 to 26, and in Published German Application 37 35 002.

It has previously been believed that, for an after-treatment of the exhaust gases from the Claus process plant and to ensure that the gases, which in addition to $H_2S$ and $SO_2$ contain COS and $CS_2$, will be desulfurized to a high degree, it is necessary to provide a separate catalytic stage for effecting a hydrogenation and hydrolysis at the same time, as is described in Published German Application 37 35 002 and, e.g., also in European Patent 0 054 772.

OBJECT OF THE INVENTION

It is an object of the invention to effect in the above-mentioned process a production of elemental sulfur in a simple manner and to eliminate the need for a separate stage for a catalytic hydrogenation and hydrolysis.

Another object is to provide a process effecting desulfurization to a high degree in conjunction with elemental sulfur production.

SUMMARY OF THE INVENTION

This is accomplished in accordance with the invention in that oxygen is admixed with the exhaust gas which comes from the last sulfur cooler of the Claus process plant and which contains 0.5 to 2.0% by volume $H_2S$ and also contains COS, $CS_2$ and $H_2O$, the exhaust gas is heated to a temperature of at least 200° C. and is contacted with a catalyst which comprises at least 80% by weight $TiO_2$, elemental sulfur is condensed and is separated from the exhaust gas, and the gas at a temperature from 120° to 160° C. is contacted with a catalyst that comprises at least 80% by weight $Al_2O_3$.

At a temperature in the range of 200° to 400° C. the high-$TiO_2$ catalyst can accelerate not only the oxidation of $H_2S$ to elemental sulfur but also the hydrolysis of COS and $CS_2$ to form $CO_2$ and $H_2S$. This ability of the catalyst is utilized in the process in accordance with the invention.

It is desirable to provide the catalyst, which comprises at least 80% by weight $TiO_2$, with 0.3 to 5% by weight of an impregnate which comprises at least one of the metals nickel, iron, and cobalt. The production of such a catalyst is described in Published German Application 39 25 574.

BRIEF DESCRIPTION OF THE DRAWING

The above and other objects, features and advantages of my invention will become more readily apparent from the following description, reference being made to the accompanying highly diagrammatic drawing, the sole FIGURE of which is a flow diagram illustrating the invention.

SPECIFIC DESCRIPTION

The gas which contains $H_2S$ and which usually contains $CO_2$ and may contain further impurities and particularly hydrocarbons is fed in line 1 to the combustion chamber 2 of a Claus process plant, which is known per se. Through line 3, the combustion chamber 2 is supplied with oxygen (e.g., in the form of air) at a controlled rate for effecting a partial combustion and for the production of a gas mixture, which contains 1 to 3 moles $H_2S$ per mole of $SO_2$. The gas mixture which is withdrawn from the combustion chamber 2 in line 5 contains elemental sulfur, which is condensed in the cooler 6 and withdrawn in line 7.

The effluent gas mixture in line 8 is treated further in the catalytic stage 9 of the Claus process plant. In that section, $2H_2S + SO_2$ so are converted in one stage or in a plurality of stages to elemental sulfur and water. This is effected, e.g., by means of catalysts based on $Al_2O_3$ and/or $TiO_2$ and at a temperature in the range of about 200° to 400° C.

The exhaust gas from the catalytic section of the Claus process plant is fed in line 10 to a cooler 11, in which elemental sulfur vapor is condensed and from which the condensate is withdrawn in line 12.

The exhaust gas which leaves the Claus process plant in line 15 has approximately the following composition:

| | |
|---|---|
| $H_2S$ | 0.5 to 1.5% by volume |
| $SO_2$ | 0.1 to 0.5% by volume |
| COS | 0.02 to 0.3% by volume |
| $CS_2$ | 0.02 to 0.3% by volume |
| $H_2O$ | 20 to 50% by volume |

Oxygen, such as air, is supplied in line 16 and is admixed with the latter gas mixture.

The rate of oxygen is so controlled that it is sufficient for the subsequent oxidizing reactions.

The gas mixture flows in line 17 to a heater 18, in which the temperature is raised to 200° to 400° C., preferably to at least 220° C., by an indirect heat exchange. The gas mixture is fed through line 19 to a first aftertreating reactor 20, which contains a fixed bed that consists of a granular $TiO_2$ catalyst, which comprises at least 80% by weight $TiO_2$ and in addition thereto is preferably impregnated with nickel, iron or cobalt. In that first aftertreating reactor 20 $H_2S$ is oxidized to form elemental sulfur, and COS and $CS_2$ are hydrolyzed to form $CO_2$ and $H_2S$. That processing is effected at a temperature above the dew point temperature of sulfur so that the gas mixture discharged in line 23 contains elemental sulfur vapor, which is condensed in the cooler 24 and withdrawn therefrom through line 25.

The remaining gas flows through line 26 to a second aftertreating reactor 28, which contains a fixed bed consisting of an $Al_2O_3$ catalyst, which comprises at least 80% by weight $Al_2O_3$ and in addition thereto may be impregnated with Ni, Fe or Co.

In the second reactor 28, a temperature of 120° to 160° is maintained and $H_2S$ is again reacted with $SO_2$ to form elemental sulfur, which condenses on the catalyst. The catalyst laden with elemental sulfur is regenerated from time to time in that it is heated and is purged, e.g., with water vapor, and the sulfur is withdrawn through line 29. A second catalyst bed, which is not laden and which is not shown in the drawing is used in the process during the regeneration. The exhaust gas which is discharged in line 30 from the second aftertreating reactor 28 still contains about 200 to 600 ppm $H_2S$ and about 100 to 300 ppm $SO_2$ and for this reason is preferably passed through an afterburner 31 before it is discharged into the atmosphere through the chimney 32.

SPECIFIC EXAMPLE

A plant which is designed as shown in the drawing is fed through line 1 at a rate of 3198 sm$^3$ = standard cubic meter or m$^3$ STP) with a gas which contains $H_2S$ and $CO_2$ and is at a temperature of 32° C. and under a pressure of 1.6 bars. That gas is composed of

| | |
|---|---|
| $H_2S$ | 87.1 mole % |
| $CO_2$ | 8.4 mole % |
| $H_2O$ | 3.0 mole % |
| $CH_4$ | 1.0 mole % |
| $C_2H_6$ | 0.4 mole % |
| $C_3H_8$ | 0.1 mole % |

In the combustion chamber that gas is partly combusted with 6323 sm$^3$/h air at 60° C. The combustion gas in line 5 has an $H_2S$:$SO_2$ mole ratio of 1.88:1. The gas mixture is cooled at 250° C. in the cooler 6, from which 2594 kg/h elemental sulfur are withdrawn. This is succeeded by a heating to 280° C. before the Claus process catalysts in section 9.

The Claus process plant is effected in two stages, in which $Al_2O_3$ is used as a catalyst. Elemental sulfur at a total rate of 1277 kg/h is obtained by the Claus process catalysts and in the cooler 11. The exhaust gas from the Claus process catalysis is cooled to 135° C. in the cooler 11. The gas flows in line 15 at a rate of 8350 sm3/h and has the composition stated in column A of the following Table

| | A | B |
|---|---|---|
| $H_2S$ | 0.70 mole % | 0.30 mole % |
| $SO_2$ | 0.14 mole % | 0.15 mole % |
| $H_2O$ | 32.50 mole % | 32.72 mole % |
| CO | 0.90 mole % | 0.89 mole % |
| $CO_2$ | 3.06 mole % | 3.06 mole % |
| COS | 0.03 mole % | 40 ppm |
| $CS_2$ | 0.02 mole % | 20 ppm |
| $N_2$ | 59.05 mole % | 59.31 mole % |
| $H_2$ | 3.60 mole % | 3.56 mole % |
| S (elemental) | 8.3 kg/h | 4.75 kg/h |

99 sm$^3$/h air are added in line 16 to the gas. The gas leaving the heater 18 is at a temperature of 205° C. The first aftertreating reactor 20 contains a catalyst which comprises $TiO_2$ and is impregnated with 5% by weight Fe. The catalyst in the second aftertreating reactor 28 comprises $Al_2O_3$ and is impregnated with 1% by weight Ni. Elemental sulfur is withdrawn at a rate of 55 kg/h through line 25 and at a rate of 42 kg/h through line 29. The gas in line 26 has the composition stated in column B of the Table. That gas has a flow rate of 8430 sm3/h and is at a temperature of 125° C. The purified gas in line /30 has the following residual contents of sulfur-containing components:

| | |
|---|---|
| $H_2S$ | 550 ppm |
| $So_2$ | 275 ppm |
| COS | 40 ppm |
| $CS_2$ | 20 ppm |

For a conversion of all sulfur-containing components to sulfur dioxide that gas is supplied to an afterburner before the gas is discharged into the atmosphere.

We claim:

1. A process for producing elemental sulfur from a gas which contains $H_2S$ and carbon compounds in a Claus plant, said process comprising the steps of:
    (a) producing a gas mixture containing 1 to 3 moles of $H_2S$ per mole of $SO_2$ by partially combusting said gas containing $H_2S$ and carbon compounds, using oxygen at a controlled rate, in a combustion chamber of said Claus plant, said gas mixture also containing elemental sulfur which is condensed in a cooler and removed from said gas mixture;
    (b) reacting said gas mixture in at least one catalytic Claus stage employing at least one $Al_2O_3$ or $TiO_2$ catalyst to form elemental sulfur in a gas resulting from the catalytic Claus stage at a temperature above a dew point temperature of elemental sulfur therein;
    (c) condensing sulfur from the gas resulting from the catalytic Claus stage and separating condensed sulfur from the gas resulting from the catalytic Claus stage to produce an exhaust gas which contains 0.5 to 1.5% by volume $H_2S$, 0.02 to 0.3% by volume COS, 0.02 to 0.3% by volume $CS_2$, 0.1 to 0.5% by volume $SO_2$ and 20 to 50% by volume $H_2O$;
    (d) admixing oxygen with said exhaust gas of step (c) so that the amount of oxygen is sufficient to oxidize the $H_2S$ contained in the exhaust gas to produce elemental sulfur;
    (e) heating said exhaust gas from step (d) to a temperature of at least 200° C.;
    (f) contacting said exhaust gas, heated in step (e) and admixed with oxygen in step (d) in a first fixed bed with a catalyst comprising at least 80% by weight $TiO_2$ at a temperature in the range of 200° to 400° C. and above the dew point temperature of sulfur to produce elemental sulfur vapor in said exhaust gas by oxidation of $H_2S$ and hydrolysis of COS and $CS_2$, said catalyst containing 0.3 to 5% by weight of an impregnate selected from at least one of the group which consists of nickel, iron, and cobalt, and from said first fixed bed withdrawing an exhaust gas containing $H_2S$, $SO_2$, $CO_2$ and elemental sulfur;
    (g) condensing elemental sulfur from said exhaust gas withdrawn from said first fixed bed;
    (h) thereafter contacting the exhaust gas from which elemental sulfur has been condensed in step (g) with a second fixed bed of a catalyst which comprises at least 80% by weight $Al_2O_3$ at a temperature of 120° to 160° C., and condensing elemental sulfur on said catalyst of said second fixed bed; and
    (i) from said second fixed bed of step (h), withdrawing a gas containing 200 to 600 ppm $H_2S$ and 100 to 300 ppm $SO_2$ and combusting said gas to convert all sulfur values to $SO_2$ before discharge into the atmosphere.

2. The process defined in claim 1, wherein step (f) is carried out at a temperature of at least 220° C.

* * * * *